United States Patent [19]
Stephenson

[11] 3,729,152
[45] Apr. 24, 1973

[54] INERTIALLY STABILIZED OPTICAL SYSTEM FOR MISSILES

[76] Inventor: Andrew N. Stephenson, 2151 Almanor Street, Oxnard, Calif. 93030

[22] Filed: July 28, 1970

[21] Appl. No.: 64,155

[52] U.S. Cl. ............244/3.16, 250/203, 250/236
[51] Int. Cl. ..............G06f 15/50, F42b 15/02
[58] Field of Search ............244/3.16; 250/203, 250/236

[56] References Cited

UNITED STATES PATENTS

| | | | |
|---|---|---|---|
| 3,183,355 | 5/1965 | Beach | 250/203 X |
| 2,899,564 | 8/1959 | Rabinow et al. | 250/203 X |
| 3,504,869 | 4/1970 | Evans et al. | 244/3.16 |
| 2,423,885 | 7/1947 | Hammond | 244/3.16 X |
| 3,028,119 | 4/1962 | Coble | 244/3.16 X |
| 3,388,629 | 6/1968 | Brenholdt et al. | 250/203 X |

Primary Examiner—Rueben Epstein
Attorney—Richards S. Sciascia, Q. Baxter Warner and Howard J. Murray, Jr.

[57] ABSTRACT

An optical "seeker" system for a guided missile, the system being so designed that a minimum amount of structure is required to be stabilized. Whereas certain known arrangements necessitate mounting the mirror and lens of the optical assembly on a stabilized gimbal while the detector is fixed in place, the present concept reverses this approach and mounts only the detector on the gimbal while the mirror and lens are secured to the missile body. This simplifies overall design and yields a system which is not only more rugged but permits the use of larger optical components with a greater energy-collecting capacity.

4 Claims, 8 Drawing Figures

Patented April 24, 1973

ANDREW N. STEPHENSON
INVENTOR

INERTIALLY STABILIZED OPTICAL SYSTEM FOR MISSILES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Radiant-energy detection systems such as utilized in so-called "homing" missiles generally operate to first ascertain the presence of a target and then "lock on" to such target to follow it to a point of impact. In so doing, the optical portion of the system systematically explores or scans a predetermined spatial region, and examines energy collected therefrom to determine whether or not an object of interest is present. If so, the scanning terminates and the system enters its "tracking" mode to guide the missile toward such object.

The bore-sight axis of such a system is in effect "projected" into space and becomes the axis of a geometrical figure of conical configuration, the apex of which lies within the system itself. The energy collected from within such spatial region is detected and converted into a varying electrical signal representative of changes in the amount of optical energy intercepted.

Detection of a radiant-energy-emitting source during the so-called "search" mode of the system is customarily brought about by mechanically driving the optical components to execute a cyclic scanning action which results in the exploratory examination of a spatial region considerably greater in size than the *instantaneous* field of view of the optical unit itself. The components so driven usually comprise either or both of the mirrors and lenses from or through which the intercepted energy is directed to a detector or pick-up element. Upon the sensing by the latter of the presence of an energy-emitting source within the spatial region being examined, cyclic movement of the optical elements ceases and the system switches to the track mode of operation. The latter generally incorporates means for feeding the target-representative electrical signal to an error detector and then to a servo mechanism which controls the missile trajectory in accordance with target movement so that any evasive action by the target is generally ineffective to prevent impact.

In a system of the above type, it is necessary to mount at least some of the optical components so that they may be driven at scanning frequency. These mirrors and lenses are of appreciable size and weight, and those which are driven must be rotatably mounted and withstand the inertial forces developed during scan. The design requirements of such mountings become more severe as the search angle of the system widens, and their mass can approach a point where the developed forces adversely affect missile maneuverability. In any event, production costs are high due to the amount of component fabrication involved.

SUMMARY OF THE INVENTION

The present disclosure is directed to a "seeker" arrangement for missiles of the type described wherein the optical components take the form of a concentric Bowers lens. The design is based upon the premise that, if the detector remains fixed in inertial space, and if a distant target also remains fixed, the lens can roll around without causing the target image and the detector to lose their positional coincidence. Expressed differently, if the detector is inertially stabilized, the mirror and lenses of the optical system need not move, but can be securely mounted on the missile body. This effects a considerable reduction in overall weight, as well as simplifying design considerations and reducing production costs.

STATEMENT OF THE OBJECTS OF THE INVENTION

One object of the present invention, therefore, is to provide an improved "seeker" assembly for missiles of the homing type.

Another object of the invention is to provide an optical unit for an airborne vehicle which is designed to seek out and lock on to a source of radiant energy.

A further object of the invention is to provide an optical unit for a homing missile, such unit being designed so that only the detector is gimballed while the mirror and lens are fixed to the missile body.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
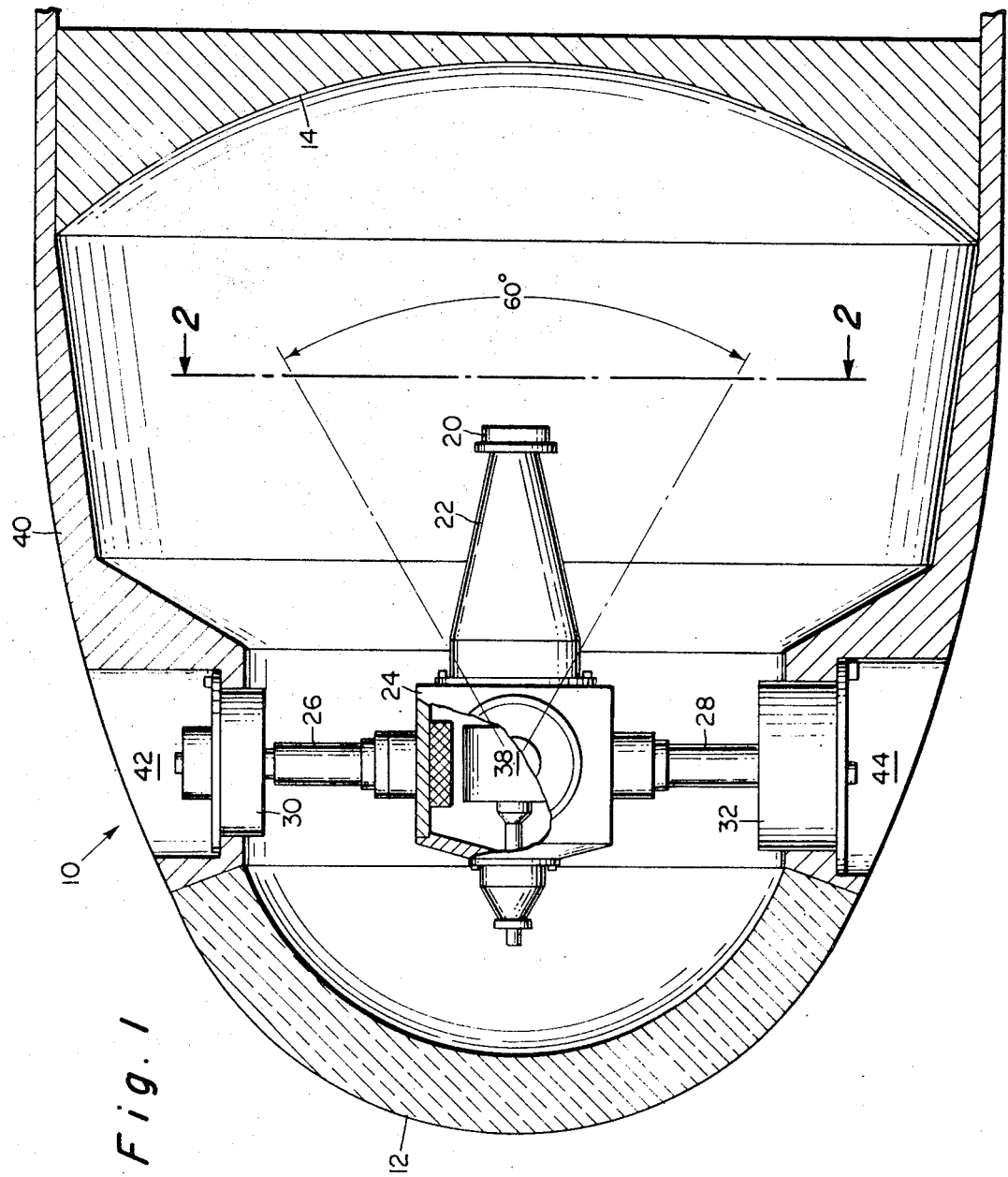
FIG. 1 is a view, partly in section, of an optical "seeker" unit for a missile, such unit being designed in accordance with a preferred embodiment of the present invention.
Figure 2:
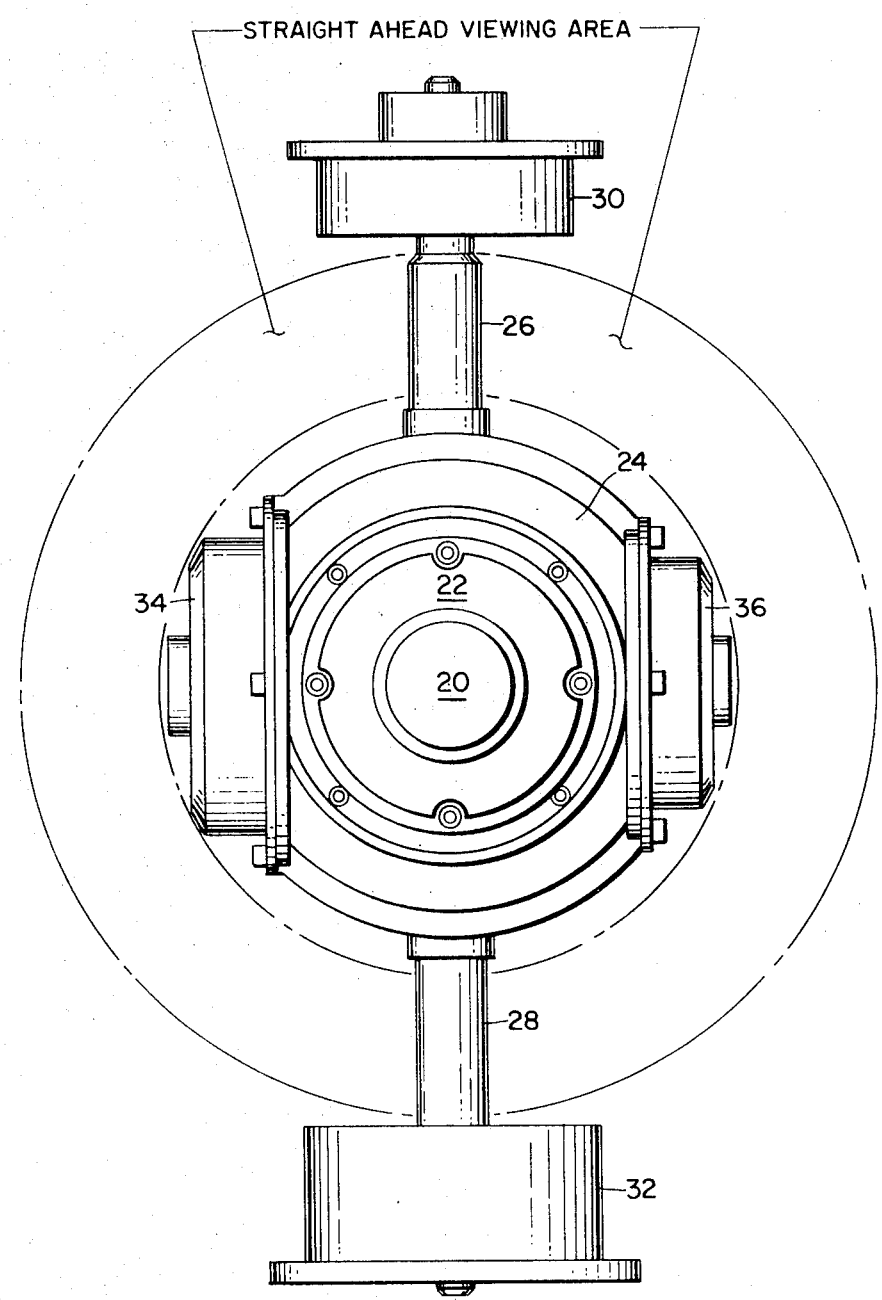
FIG. 2 is a view of a portion of FIG. 1 taken in the direction indicated by the arrows 2—2.

Referring now to the drawings, there is shown in FIGS. 1 and 2 an optical unit for a missile 10 of the homing type. Such a missile is designed to seek out an energy-emitting target and then "lock on" to such target and follow it to a point of impact. Whereas a number of arrangements are now available for performing this "seeker" function, they are generally based upon a principle which requires the cyclic movement of one or more of the energy transmitting and/or reflecting members per se. These members, in the case of Navy missiles, are of considerable size and mass, requiring the use of means for stabilizing the moving member (or members) against shock and vibration. The presence of such stabilizing means can detract from the maneuverability of the missile and in extreme instances prevent its objective from being attained.

The present concept departs from this accepted practice by utilizing two optical components both of which are fixed in position relative to the missile body. These components are a convex meniscus lens 12 (which acts as the missile dome) and a concave mirror 14 which focuses the energy passing through lens 12 onto the surface of an imaginary sphere. This arrangement is similar to a concentric Bowers, and is schematically set forth in FIG. 3 of the drawings. The incoming energy rays 16 are brought to a focus in a series of points defining a portion 18 of a sphere, so that the optical system can be said to have no "off-axis."

Figure 3:
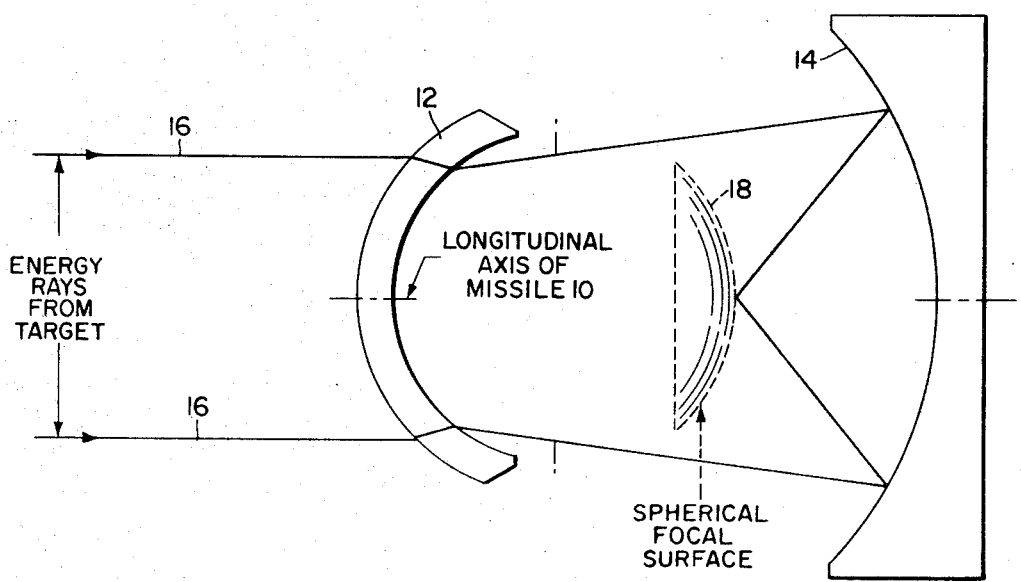
FIGS. 3 and 4 are schematic illustrations of certain optical principles upon which the present invention is based.
Figure 4:
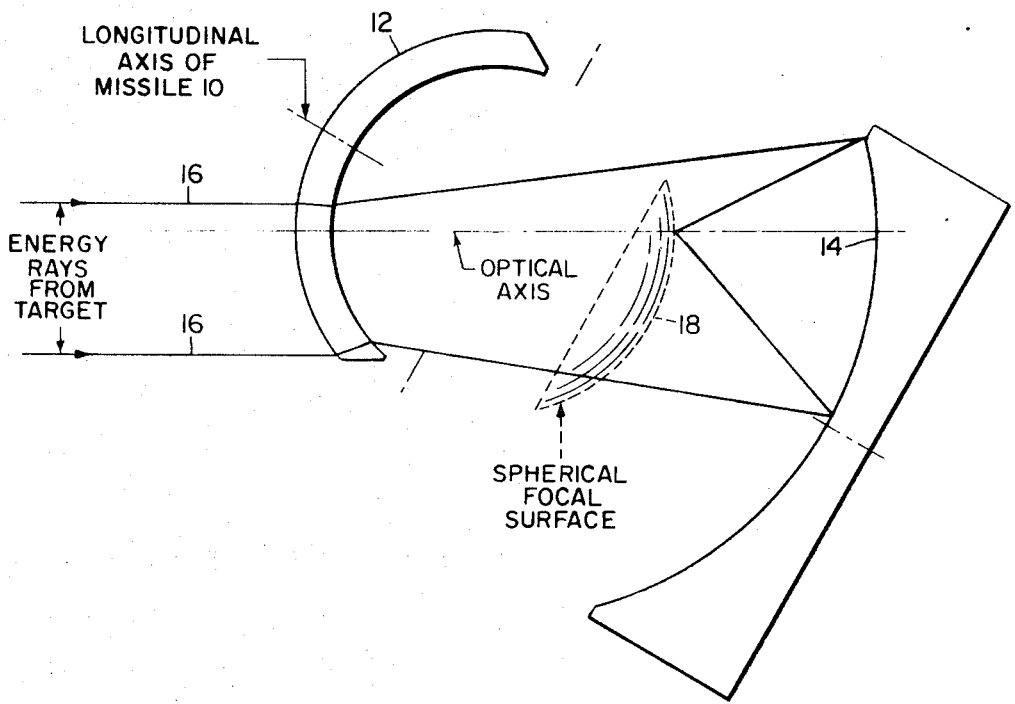

The present concept provides for a detector of the energy so focused, and for mounting this detector so that it can effect a cyclic scanning action in order to explore a predetermined spatial region. This detector, identified by the reference numeral 20 in FIG. 1, may be of the conventional quadrant type and is mounted on a gimballed arm 22 constituting an extension of a housing 24 arranged for universal movement in a manner to be described hereinafter. The axis about which the housing 24 is gimballed is the center of the imaginary spherical surface 18 (FIGS. 3 and 4), so that arm 22 constitutes in effect a radius of that sphere terminating in detector 20. The latter thus lies at the focal point of the energy rays reflected by the mirror 14 when the missile 10 is oriented as shown in FIGS. 1 and 3. It is important to note that no movement of arm 22 can result in a failure of detector 20 to lie on the imaginary spherical surface 18, so that there will always be coincidence between such detector and the focal point of the energy rays 16 whenever the missile 10 has located a target and has "locked on" thereto through operation of circuit means known in the art and which forms no part of the present invention.

In order to explore a spatial region, the detector 20 is so gimballed as to move through an angle of approximately 60° in azimuth and approximately 7° in elevation, although these limits are arbitrary and will depend on the type of missile and the environment in which it is to be employed. In order to permit such detector movement, the housing 24 is supported between a pair of coaxial shafts 26 and 28 which are journalled in, and rotatable by, a pair of torquers 30 and 32, respectively. The latter are of standard design, and hence need not be described in detail. In similar fashion, the housing 24 is caused to move in a direction perpendicular to that produced by the torquers 30 and 32 through the action of a second pair of torquers 34 and 36 (see also FIG. 2). The latter produce an approximately 60° cyclic swing of detector 20 (FIG. 1) while the former generate an approximately 7° "nod" of the detector during a representative scan. All four torquers are energized by currents having waveforms conventional in systems of the nature being described, these currents being supplied to the torquers over conductors (not shown). Another conductor (also not shown) connects detector 20 to the missile guidance circuitry.

From the above it will be recognized that application of proper cyclically varying currents to the torquers 30-36 will result in the detector 20 periodically covering a spherical surface portion representing different focal points of light rays from a given spatial region and incident upon the lens 12. In other words, the "seeker" unit of FIGS. 1 and 2 can explore this region in search of a target. When such a target is found, the change in energy incident on detector 20 acts to terminate the scanning action by means forming no part of the present concept. However, it is desired to maintain the missile 10 "locked on" to the target so discovered, and hence means are provided for stabilizing the detector assembly at the point where scanning terminates.

This means takes the form of a small gyro 38 carried within housing 12 and centered essentially at the point about which the scanning action of detector 20 occurs. In FIG. 1 a small portion of housing 24 is broken away to illustrate the location of this gyro. It is energized from an external source (not shown) and tends in the usual manner to preclude movement of the housing 24 and hence detector 20 when the latter is acted upon by inertial forces. The scanning action of the detector, described above, occurs against the action of the gyro, and when the scanning terminates the gyro acts to hold the detector in the position the latter then occupies.

As shown in FIG. 1, lens 12 constitutes the front end or "nose" of missile 10. Mirror 14 is supported within the generally tubular body 40. The torques 30 and 32 are located within recesses 42 and 44, respectively, formed in body 40 and are bolted or otherwise secured to the body itself. Withdrawal of either or both torquers for inspection or repair is thus facilitated, and such action also allows for removal of the entire gimballed unit when such action is desired.

If it be assumed that the detector 20 remain "fixed" in inertial space, and if it be further assumed that a distant target remains similarly "fixed," then the missile 10 can roll through an appreciable angle without the target image leaving the detector. This is brought out by FIG. 4 of the drawings.

Figure 5A:
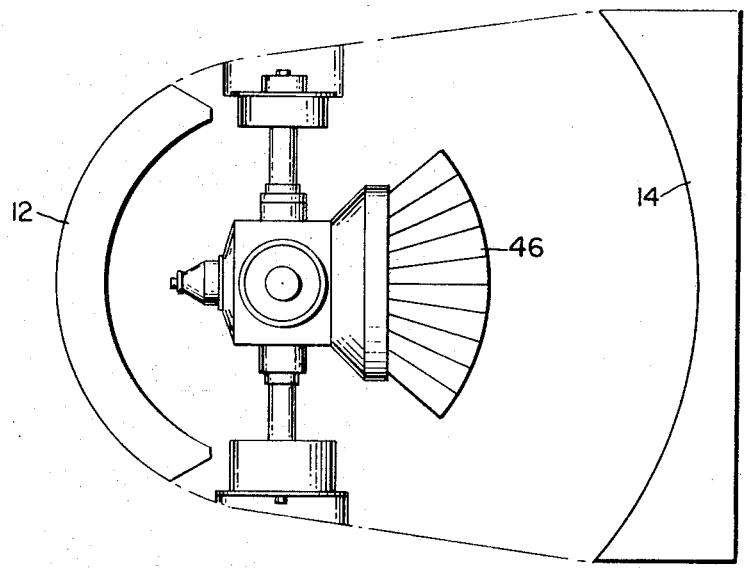
FIGS. 5a and 5b are plan and front views, respectively, of a modified type of energy detector usable with the present invention.
Figure 5B:
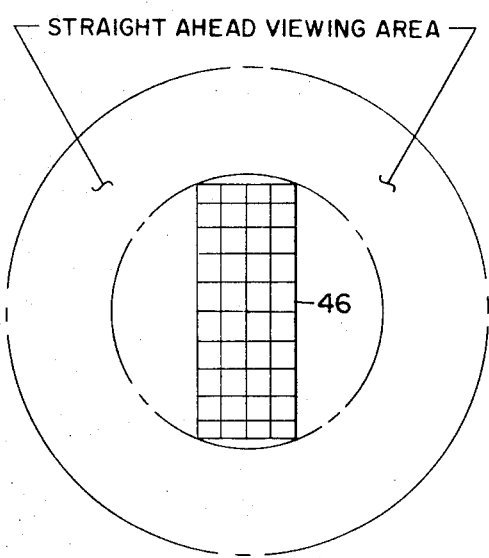

FIG. 5a and 5b show the invention principle applied to a large aperture wide-angle receiver, such as a laser horizon-viewing device for countermeasures or intelligence-gathering. The instantaneous field of view of the detector 46 of these figures is 100° in azimuth and 40° in elevation.

Figure 6A:
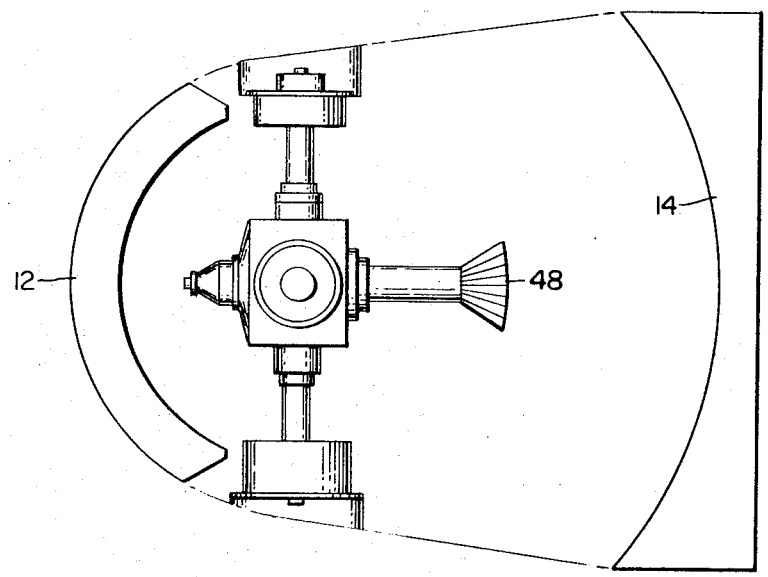
FIGS. 6a and 6b are plan and front views, respectively, of still another form of energy detector.
Figure 6B:
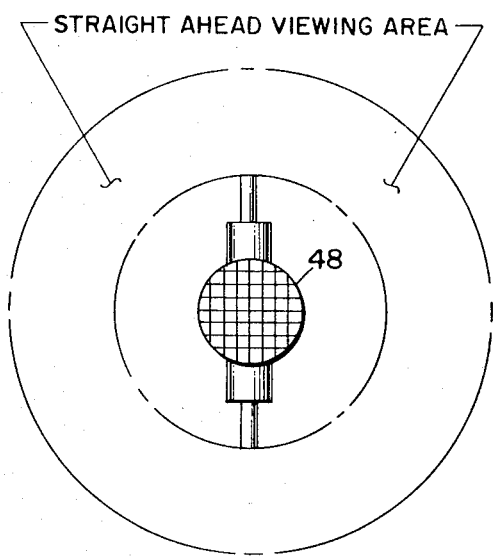

Such a wide-angle lens is applicable to detection by logic, as in FIGS. 6a and 6b. These figures show a matrix 48 of gimballed detectors wherein tracking is accomplished by logic elements having a relatively small field of view but still possessing the ability to "miss" several pulses without returning to a search mode. On the other hand, the gimballed field is capable of enlargement to as much as ± 70°. An extension of this design might comprise additional detectors to make up a full silicon vidicon wherein tracking is carried out with a video signal. A display can be presented to an observer, such as the pilot of an aircraft from which the missile is launched.

Although not specifically illustrated or described, the invention principle is applicable to aircraft collision-avoidance systems, wide-search-angle remote surveillance and/or tracking, programmed camera panning (for example, following a moving part through a manufacturing process), taking aircraft cockpit simulation pictures by programming aircraft motions, night-vision viewing for tank divers or helicopter pilots, and remote viewing of missile launchers.

Obviously many modifications and variations of the present invention are possible in the light of the above teachings. It is therefore to be understood that within the scope of the appended claims the invention may be practiced otherwise than as specifically described.

I claim:

1. In an optical system for ascertaining the presence of a source of radiant energy, the combination of:

an energy-collection unit having a predetermined field of view for intercepting energy radiated from a source within said field of view and for bringing such intercepted energy to a focal point, all of the focal points representing different locations of energy-emitting sources within said field of view defining a portion of the surface of a sphere, and a detector of radiant energy arranged for movement relative to said energy-collection unit, said detector being solely pivotable about a point coinciding with the center of the sphere a portion of the surface of which is defined by all said focal points, with said detector lying on such surface, torqueing means for causing said detector to scan the portion of spherical surface defined by all said focal points representing different locations of energy-emitting sources within said field of view, gyro means for gyroscopically stabilizing said detector and tending to preclude movement thereof when acted upon by inertial forces, any scan action of the detector occurring against the action of said gyro means and upon termination of scan action the gyro means acting to hold the detector in the position it then occupies, whereby pivotal movement of said detector relative to said energy-collection unit will cause said detector to trace a path lying on the surface of said sphere, with any instantaneous position of said detector essentially coinciding with at least one of the points to which the energy intercepted by said unit may be focused, and wherein when said detector is fixed in inertial space on a radiant energy source similarly fixed in space said radiant energy-collection unit can roll through an appreciable angle without the radiant energy source image leaving the detector.

2. A system according to claim 1 in which said detector is of the wide-angle type having an instantaneous field of view approaching 100° in one coordinate.

3. A system according to claim 1 in which said detector is composed of a plurality of detector elements each covering a small portion of the field of view.

4. A system according to claim 1 in which said energy-collection unit is securely attached to and supported by a missile of the "homing" type, said detector being adapted for scanning movement during a "search" mode of operation, and for gyroscopic stabilization during a subsequent "tracking" mode of operation.

* * * * *